US007679300B2

(12) United States Patent
Miyaura et al.

(10) Patent No.: US 7,679,300 B2
(45) Date of Patent: Mar. 16, 2010

(54) TRIGGER SWITCH

(75) Inventors: Hiroyuki Miyaura, Ibaraki (JP); Yoshiyuki Baba, Hikone (JP); Koji Omori, Takatsuki (JP)

(73) Assignee: OMRON Corporation, Kyoto (JP)

( * ) Notice: Subject to any disclaimer, the term of this patent is extended or adjusted under 35 U.S.C. 154(b) by 230 days.

(21) Appl. No.: 11/857,264

(22) Filed: Sep. 18, 2007

(65) Prior Publication Data

US 2008/0069548 A1 Mar. 20, 2008

(30) Foreign Application Priority Data

Sep. 19, 2006 (JP) ............................ 2006-252726

(51) Int. Cl.
*H02P 1/00* (2006.01)

(52) U.S. Cl. .................................... 318/268; 318/400.3

(58) Field of Classification Search ................. 318/268, 318/400.3, 466; 388/837; 315/362
See application file for complete search history.

(56) References Cited

U.S. PATENT DOCUMENTS 4,391,237 A * 7/1983 Abe et al. .............. 123/179.21
2003/0141764 A1* 7/2003 Brown et al. ................ 307/103

FOREIGN PATENT DOCUMENTS

CN 1200552 A 12/1998
CN 1819085 A 8/2006
EP 0 526 821 A 2/1993
EP 1 691 385 A 8/2006
JP 2001-25982 A 1/2001
JP 2006-218560 A 8/2006
JP 2006-218605 A 8/2006

OTHER PUBLICATIONS

European Search Report issued in European Application No. EP 07 11 5073 mailed on Nov. 30, 2007, 3 pages.
English abstract of JP2006218605 published Aug. 24, 2006, esp@cenet database, 1 page.
Patent Abstracts of Japan, Publication No. 2006-218560, Publication Date: Aug. 24, 2006, 1 page.
English abstract of JP2001025982 published Jan. 30, 2001, esp@cenet database, 1 page.
Chinese Examination Report for Application No. 2007101411078, mailed on May 22, 2009 (8 pages).
English Abstract for Chinese Publication No. 1819085, publication date Aug. 16, 2006 (1 page).
English Abstract for Chinese Publication No. 1200552, publication date Dec. 2, 1998 (1 page).

* cited by examiner

*Primary Examiner*—Karen Masih
(74) *Attorney, Agent, or Firm*—Osha • Liang LLP

(57) ABSTRACT

A trigger switch performs speed control of a motor according to a pull-in amount of a trigger. A wiring path for lead wires connects the trigger switch and an auxiliary device. The wiring path is formed in an insulating wall. The insulating wall isolates a pair of power supply terminals, each connected to a power supply, from each other.

10 Claims, 12 Drawing Sheets

PRIOR ART

TRIGGER SWITCH

BACKGROUND OF THE INVENTION

1. Field of the Invention

The present invention relates to trigger switches, in particular, to a trigger switch for controlling a direct current (DC) motor of a rechargeable electrical power tool.

2. Description of the Related Art

The rechargeable electrical power tool for controlling the rotation number of a motor that drives a distal end tool according to the pull-in amount of a trigger is normally manufactured with a trigger switch in which the trigger and a control circuit of the motor are packaged incorporated therein.

As disclosed in Japanese Patent Application Laid-Open No. 2006-218605, the rechargeable electrical power tool includes a motor on the upper part and a battery on the lower part of a grip accommodating the trigger switch. A pair of power supply terminals for connecting a power supply is thus arranged at the lower end of the trigger switch, and an output terminal for connecting the motor is arranged on the upper part.

As disclosed in Japanese Patent Application Laid-Open No. 2006-218560, an insulating wall for isolating the power supply terminals is arranged between the two power supply terminals to prevent one part of a stranded wire or a solder forming an electrical wire from projecting out or being stringy and contacting the other power supply terminal thereby causing short-circuit when connecting the electric wires to the respective power supply terminals.

The signal line is sometimes desired to be derived from the trigger switch to connect to an auxiliary device for providing additional function to the electrical power tool such as lighting system that operates according to the pull-in amount of the trigger as disclosed in Japanese Patent Application Laid-Open No. 2001-25982.

FIG. 15 shows a conventional trigger switch 100 provided with additional function. The trigger switch 100 includes two halved housings 101*a*, 101*b* made of insulating body for accommodating circuit components, and a trigger 102 arranged projecting from the housings 101*a*, 101*b*, where a pair of power supply terminals 103*a*, 103*b* and a pair of lead wires 104*a*, 104*b* output to the auxiliary device such as lighting system and control device are arranged lined with each other along the seam of the housings 101*a*, 101*b* at the lower end.

The power supply terminals 103*a*, 103*b* and the lead wires 104*a*, 104*b* are desirably derived from the seam of the housings 101*a*, 101*b* to maintain dust resistance. Since the current output to the auxiliary device is small, insulation electric wire having a narrow wire diameter may be used for the lead wires 104*a*, 104*b*, and may be derived so as to be arranged vertically in a direction orthogonal to the seam of the housings 101*a*, 110*b* as shown in the figure.

An inter-terminal insulating wall 105 formed by extending the housings 101*a*, 101*b* is arranged between the power supply terminal 103*a* and the power supply terminal 103*b*, and a lead wire insulating wall 106 formed by extending the housings 101*a*, 101*b* is arranged between the power supply terminal 103*a* and the lead wires 104*a*, 104*b*.

As shown in the figure, the inter-terminal insulating wall 105 must have a sufficient height so that one part of the stranded wire or the solder forming the electric wires 107*a*, 107*b* do not project out or become stringy, thereby short circuiting the power supply terminals 103*a*, 103*b* when connecting the electrical wires 107*a*, 107*b* to the respective power supply terminals 103*a*, 103*b*, and normally, must have a thickness of at least about 1 mm to ensure strength. Similarly, the lead wire insulating wall 106 normally requires a thickness of about 1 mm. The lead wires 104*a*, 104*b* may be insulation electric wires having a conductor cross sectional area of about 0.2 mm$^2$, and an outer diameter of about 1.5 mm. Furthermore, a boss (guide) 108 having a thickness of about 1 mm is formed at the housings 101*a*, 101 *b* projecting out from the housings 101*a*, 101*b* to surround the lead wires 104*a*, 104*b* so that stress does not concentrate at the derived portion of the lead wires 104*a*, and 104*b*.

The lead wire insulating wall 106, the lead wires 104*a*, 104*b*, and the guide 108 arranged to add the auxiliary device to the electrical power tool occupy a length of about 3.5 mm in total at the bottom surface of the trigger switch 100. There is, however, a demand to narrow the grip as much as possible to enhance the operability of the electrical power tool. Thus, the bottom area required to derive the lead wires 104*a*, 104*b* is desirably set small, in particular, the length in the direction along the seam of the housings 101*a*, 101*b* is desirably set small in the trigger switch 100.

SUMMARY OF THE INVENTION

It is an object of the present invention to provide a trigger switch in which lead wires for connecting to the auxiliary device are derived while maintaining the bottom surface as small as possible.

In order to achieve the above aim, a trigger switch for performing speed control of a motor according to a pull-in amount of a trigger; wherein a wiring path for lead wires for connecting the trigger switch and an auxiliary device is formed in an insulating wall for isolating a pair of power supply terminals connected to a power supply from each other is provided according to the present invention.

According to such configuration, since the lead wires are arranged in the insulating wall between the electrode terminals, a new insulating wall, boss of the lead wires, or the like does not need to be arranged and the thickness of the lead wires is absorbed by the thickness of the insulating wall between the electrode terminals. Thus, the lead wires for connecting with the auxiliary device can be arranged without increasing the length of the bottom surface of the trigger switch.

The trigger switch of the present invention further includes an insulative housing, formed by two divided strips, for internally accommodating circuit components; where the power supply terminals and the lead wires may be sandwiched at a seam of the housing.

According to such configuration, the dust resistance process of the portion where the lead wires pass through the housing is facilitated.

In the trigger switch of the present invention, the auxiliary device may be a lighting system.

According to the present invention, the user friendliness of the electric power tool is enhanced by lighting the processing object.

In the trigger switch of the present invention, an afterglow circuit for outputting to the lighting system and accumulating charges while power is being supplied to at least the motor, and maintaining the output to the lighting system for a predetermined time after the power to the motor is shielded by discharging the accumulated charges may further be arranged.

According to the present invention, the processing object is lighted even after the motor is stopped, and thus the workability enhances.

In the trigger switch of the present invention, the pull-in amount of the trigger output to the lighting system may be less than the pull-in amount of the trigger output to the motor.

According to such configuration, the processing object is lighted without rotating the motor, and thus workability such as positioning is enhanced.

Therefore, according to the present invention, a trigger switch in which the bottom area is set small while deriving the lead wires for connecting the auxiliary device is proposed by commonly using the configuration for holding and insulating the lead wires with the configuration of the insulating wall for isolating the power terminals from each other.

DETAILED DESCRIPTION OF THE PREFERRED EMBODIMENTS

The embodiments of the present invention will now be described with reference to the drawings.

Figure 1:
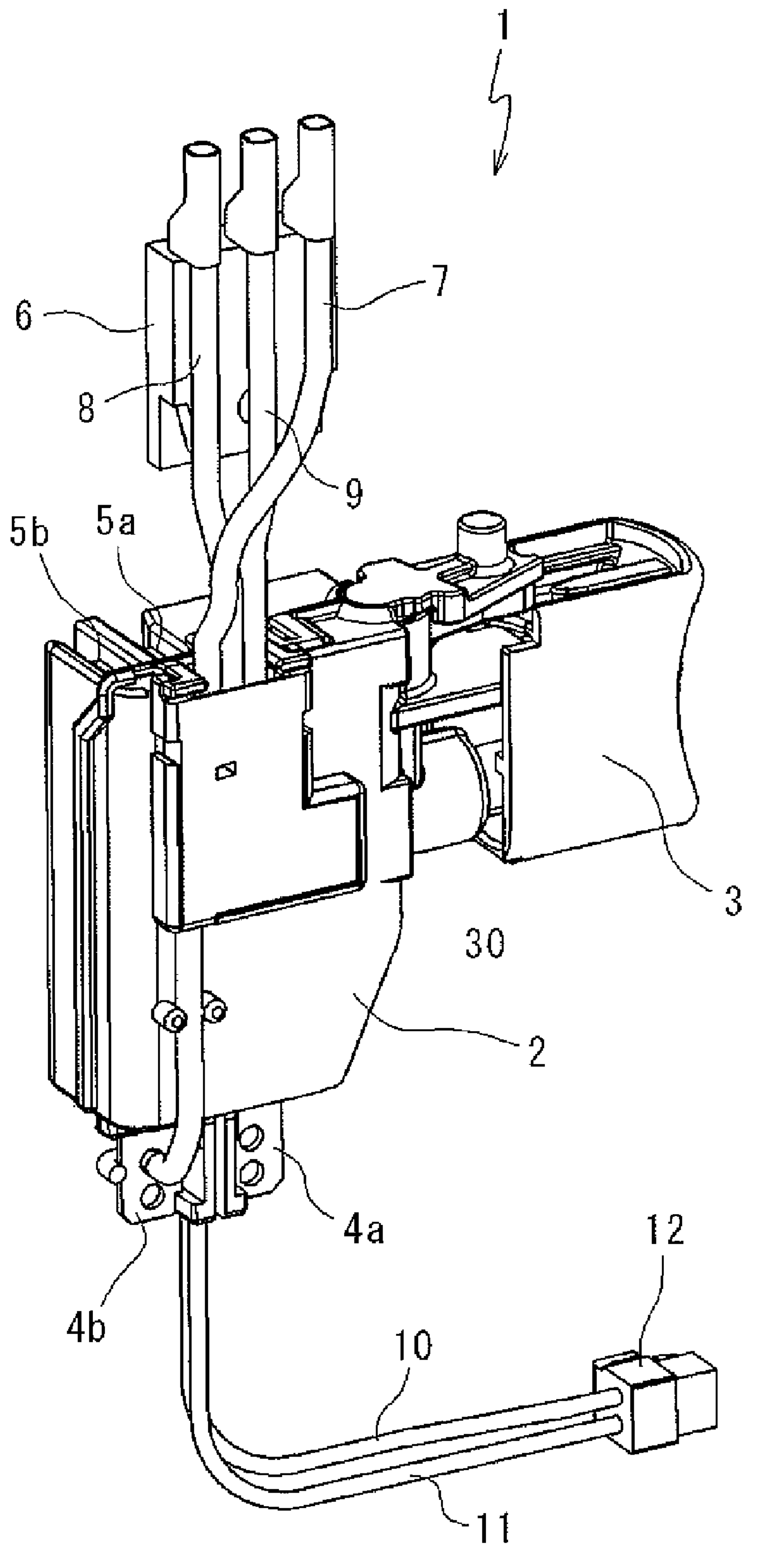
FIG. 1 shows a perspective view of a trigger switch of one embodiment of the present invention.
Figure 2:
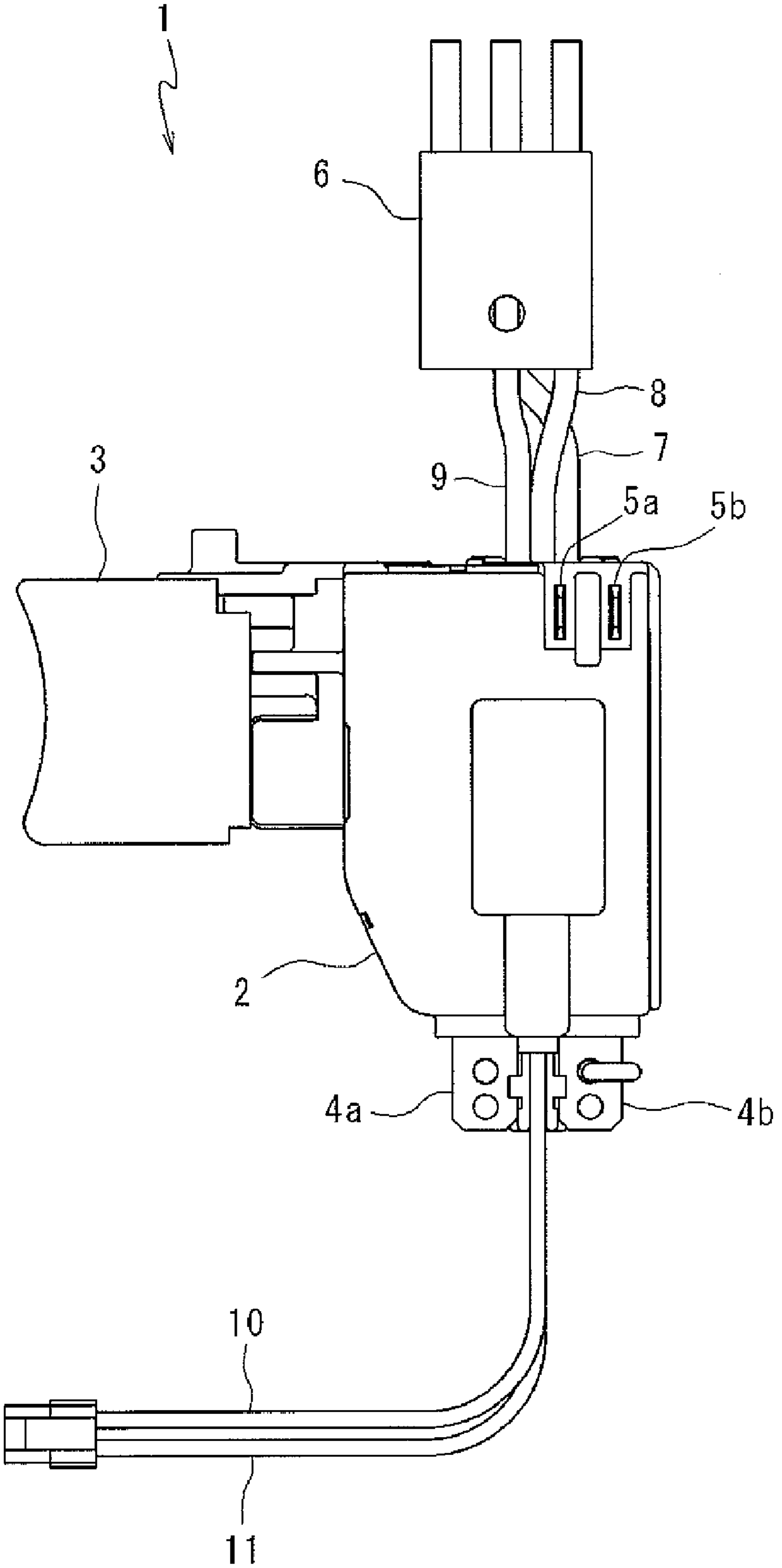
FIG. 2 shows a front view of the trigger switch of FIG. 1.

FIGS. 1 and 2 show a trigger switch 1 according to one embodiment of the present invention. The trigger switch 1 is incorporated in a grip of a rechargeable electrical power tool to control the rotation number of a motor that drives the distal end tool of the rechargeable electrical power tool.

The trigger switch 1 is configured by a housing 2 made of insulating resin and a trigger 3 which the user pulls with his/her fingers, and includes a pair of power supply terminals 4*a*, 4*b* connected to an external power supply and a pair of output terminals 5*a*, 5*b* connected to an external motor. A switching element 6 for radiation is arranged exterior to the housing 2, and insulation electric wires 7, 8, 9 are connected to circuits accommodated inside the housing 2. The trigger switch 1 has a pair of lead wires 10, 11 derived from the housing 2 to connect to a lighting system (LED) serving as an external auxiliary device by a connector 12 arranged at the distal end of the lead wires 10, 11.

Figure 3:
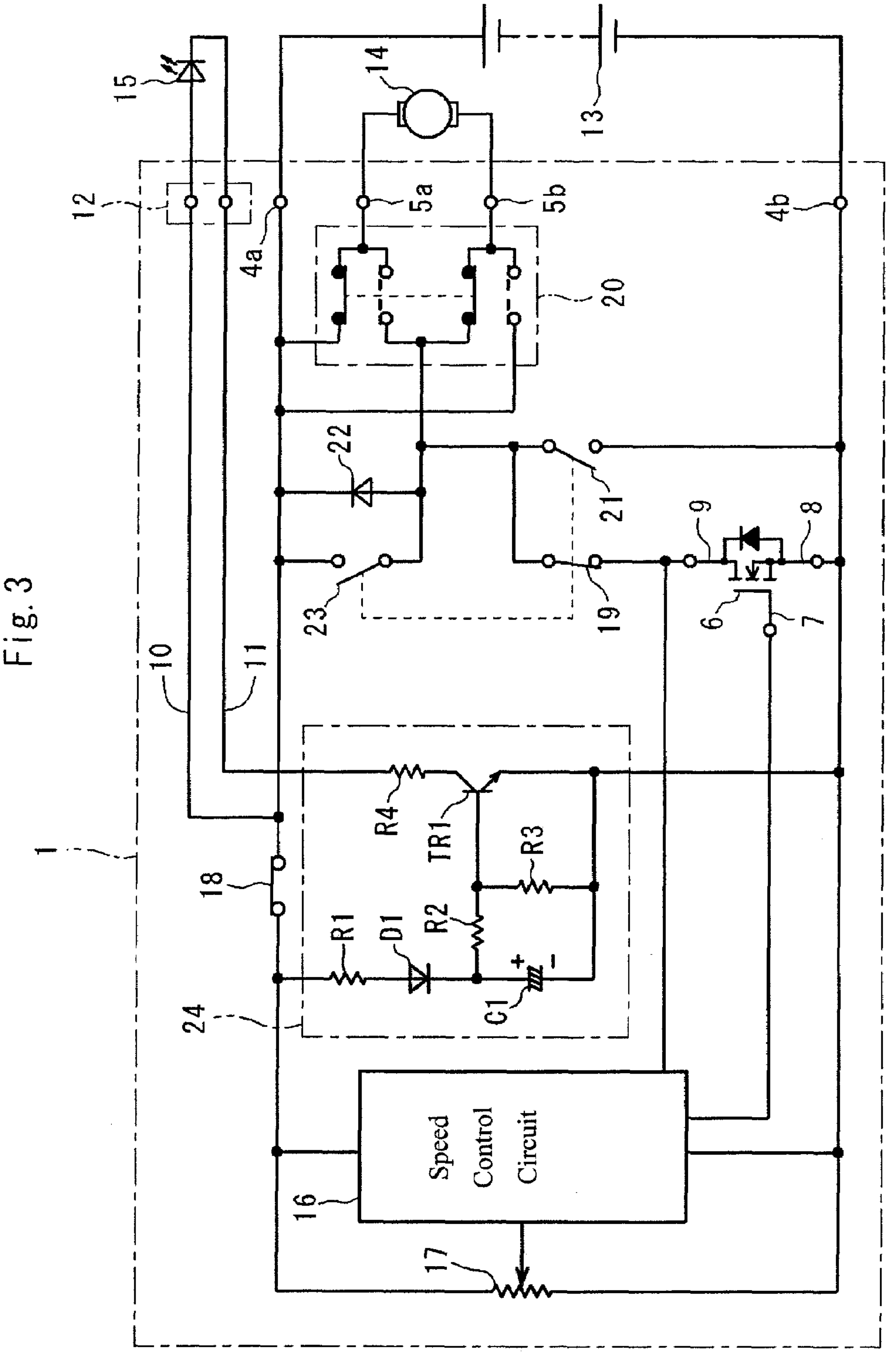
FIG. 3 shows a circuit diagram of the trigger switch of FIG. 1.

FIG. 3 shows a circuit configuration of the trigger switch 1. A power supply (battery) 13, a motor 14, and a lighting system 15 connected to the trigger switch 1 are also illustrated in the figure for the sake of easy understanding.

The trigger switch 1 controls the rotation number of the motor 14 by applying current of the battery 13 to the motor 14 via the transistor 6, and switching the transistor 6 according to the voltage dividing ratio of a voltage dividing resistor 17 by means of a speed control circuit 16. The trigger switch 1 includes a power supply switch 18 for supplying power to the speed control circuit 16; a main switch 19 for applying terminal voltage of the battery 13 to the transistor 6; a change-over switch 20 for changing the polarity of the output terminals 5*a*, 5*b* and reversing the rotating direction of the motor 14; a full-speed switch 21 for bypassing the transistor 6 and directly applying power supply current to the motor 14; a diode 22 for feeding back a back electromotive force of the motor 14 to the motor 14; and a brake switch 23 for short circuiting the motor 14 and stopping the rotation by inertia. The trigger switch 1 also includes an afterglow circuit 24 for outputting current to the lighting system 15 via the lead wires 10, 11 when the power supply switch 18 is turned ON.

The afterglow circuit 24 is configured such that when the power supply switch 18 is closed, the current flows through a resistor R1, a diode D1, a resistor R2, and a resistor R3, the voltage is applied between the base and the emitter of a transistor TRI, and collector current flows via the lighting system 15 and a resistor R4. While the power supply switch 18 is closed, charges are accumulated in a capacitor C1, whereby the voltage is applied between the base and the emitter of the transistor TR1 thereby turning ON the transistor TR1 for a predetermined time required for the capacitor C1 to discharge through the resistors R2 and R3 even after the power supply switch 18 is opened, and thus the output to the lighting system 15 is maintained.

Figure 4:
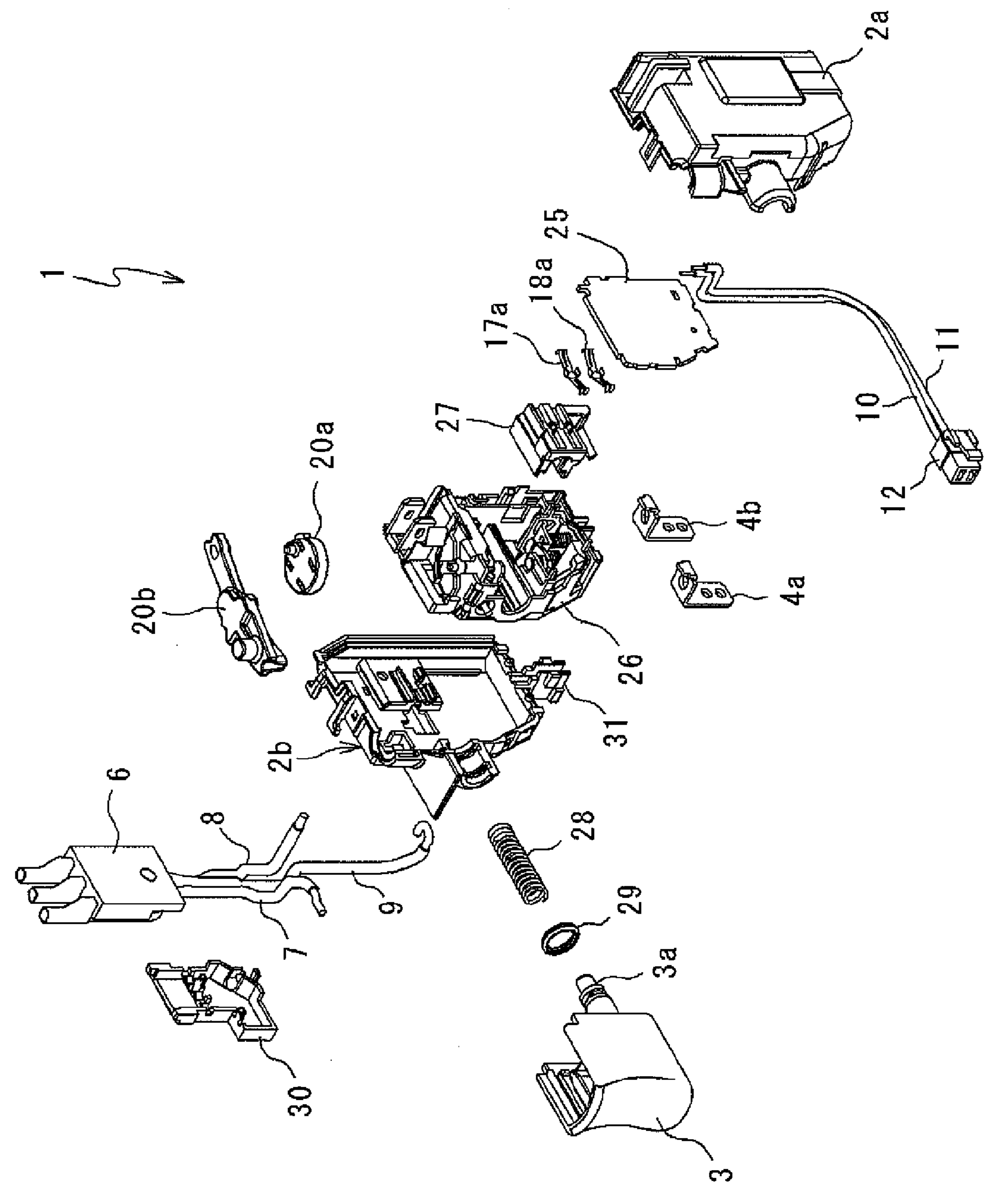
FIG. 4 shows an exploded perspective view of the trigger switch of FIG. 1.

FIG. 4 shows an internal configuration of the trigger switch 1. The housing 2 is formed from two divided strips 2*a*, 2*b* and each circuit component shown in FIG. 3 is accommodated therein. The circuit components are mainly incorporated in a print substrate 25 and a base terminal assembly 26. Specifically, the speed control circuit 16, the voltage dividing resistor 17, the power supply switch 18, and the afterglow circuit 23 are formed in the print substrate 25 by mounting circuit elements on a print circuit. The base terminal assembly 26 has the contact points of the main switch 19, the change-over switch 20, the full-speed switch 21, and the brake switch 23 as well as the electric path connecting each contact point made of a plurality of metal plates. A movable contact point unit 20*a* of the change-over switch 20 is turned by an operation lever 20*b* projected to the outside of the housing 2.

The trigger 3 has a shaft part 3*a* extending to the inside of the housing 2, and connected to a slide member 27 for supporting metal brushes 17*a*, 18*a* which are the movable contact points of the voltage dividing resistor 17 and the power supply switch 18. The trigger 3 is biased by a spring 28 so as to project from the housing 2, and a gap between the housing 2 and the shaft part 3*a* is sealed by a dust resistance member 29.

In the present embodiment, a cover 30 for covering a pull-out part from the housing 2 of the electric wires 7, 8, 9 is arranged with the external attachment of the transistor 6.

Figure 5:
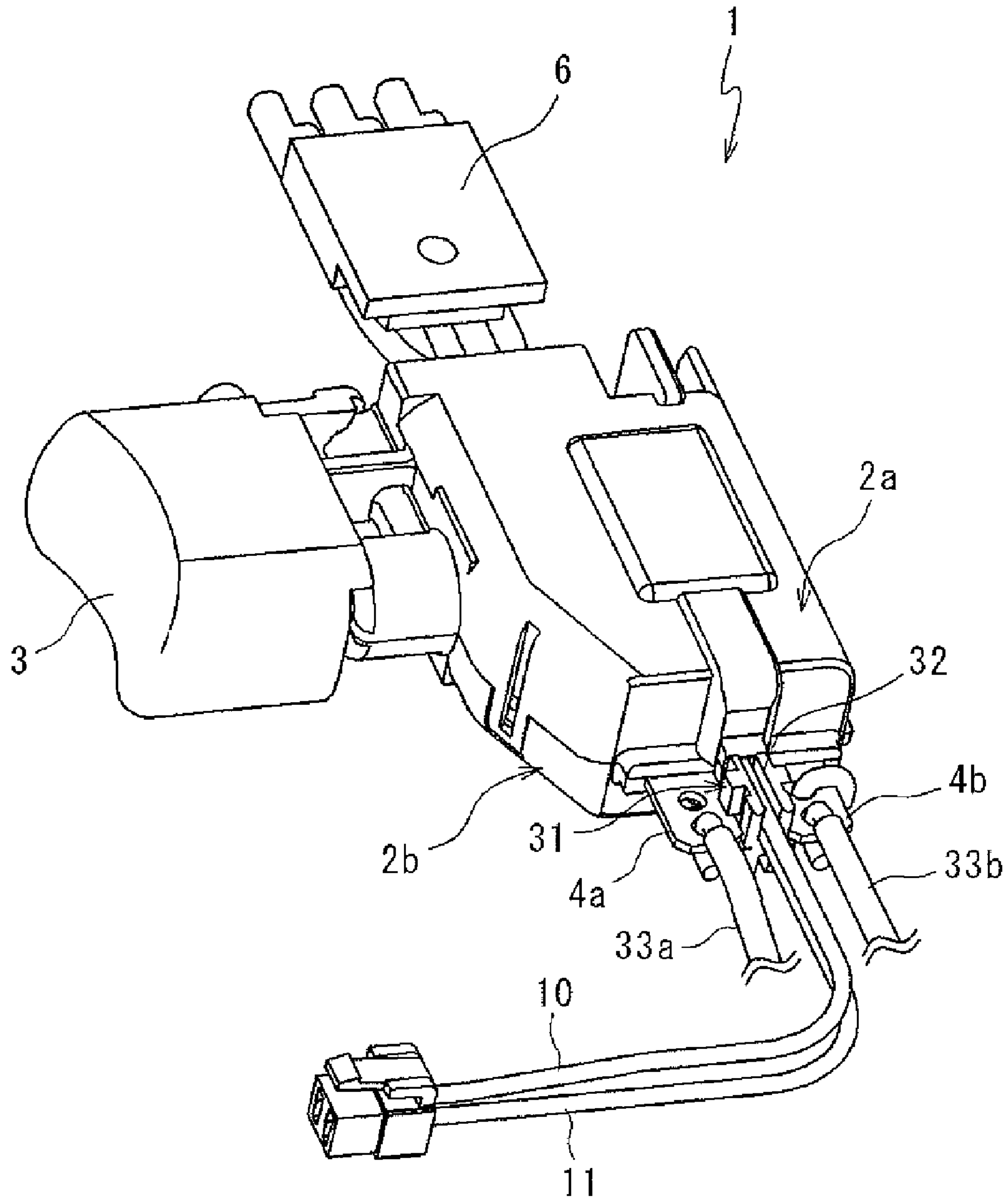
FIG. 5 shows a perspective view of a bottom part of the trigger switch of FIG. 1.

As shown in FIG. 5, an insulating wall 31 formed by extending the divided strip 2*b* is arranged between the power supply terminals 4*a*, 4*b* arranged at the bottom part of the trigger switch 1. The lead wires 10, 11 are introduced through a groove 32 formed in the insulating wall 31. Electric wires 33*a*, 33*b* connected to both poles of the battery 13 are respectively connected to the power supply terminals 4*a*, 4*b*, for example, by soldering.

Figure 6:
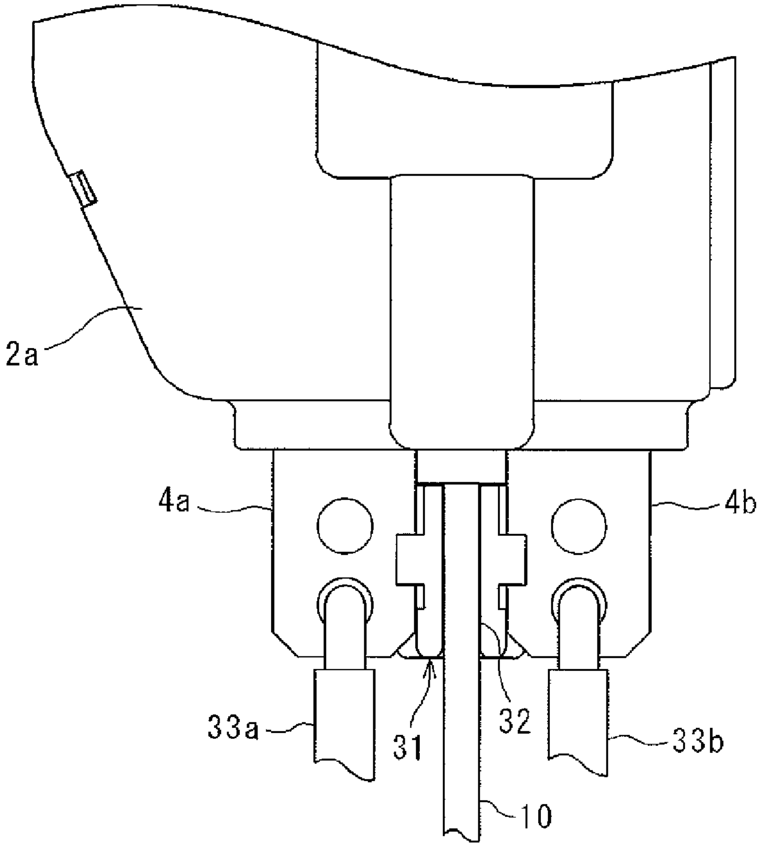
FIG. 6 shows a lower front view of the trigger switch of FIG. 1.
Figure 7:
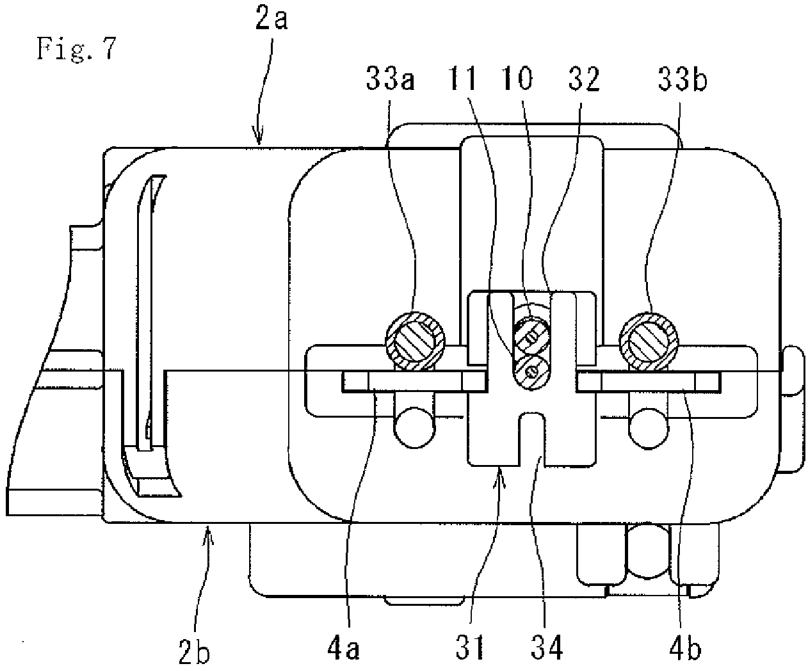
FIG. 7 shows a lower bottom view of the trigger switch of FIG. 1.
Figure 8:
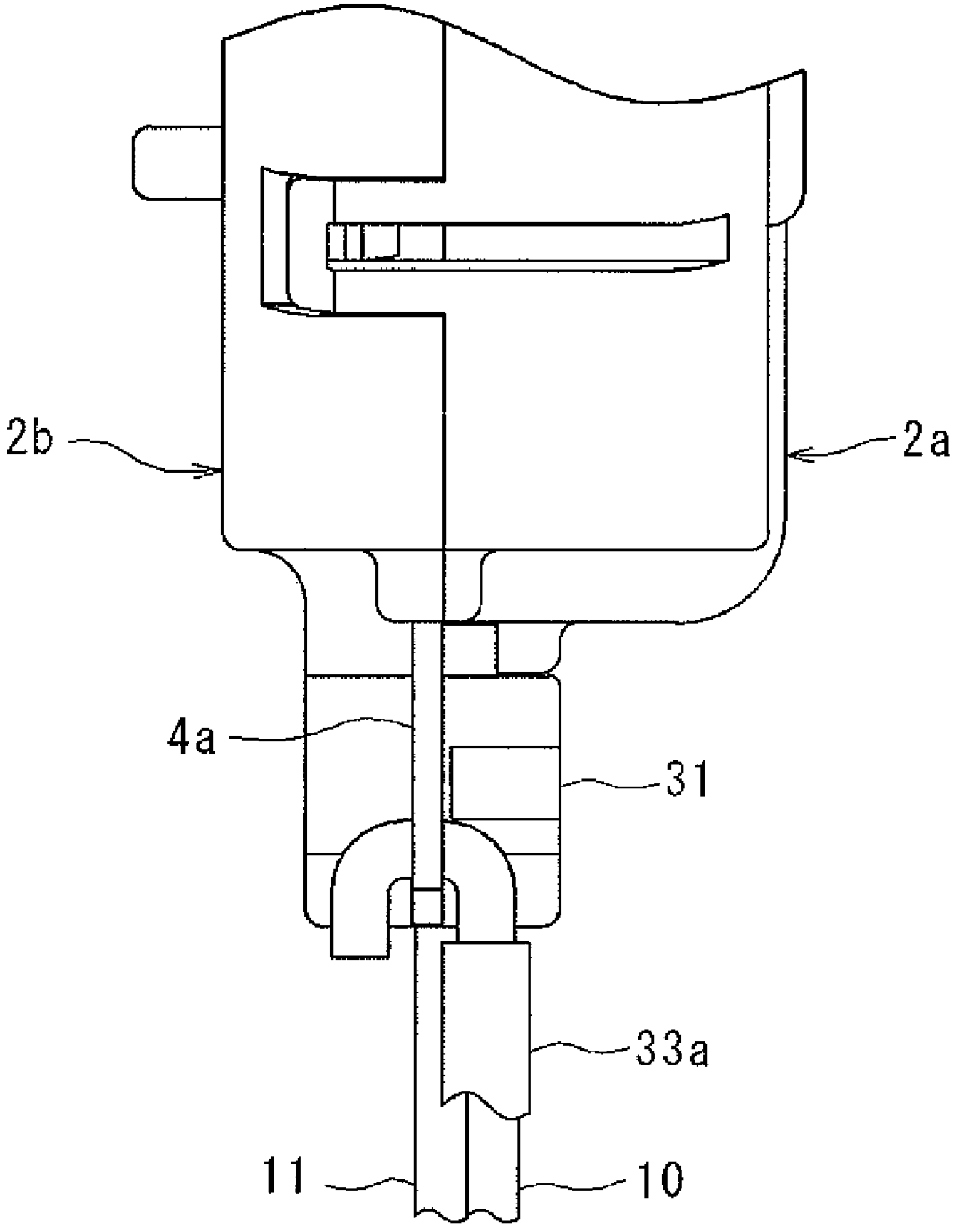
FIG. 8 shows a lower side view of the trigger switch of FIG. 1.

The structure of the power supply terminals 4*a*, 4*b* and the insulating wall 31 will now be described in detail with reference to FIGS. 6, 7, and 8 which specifically show the bottom part of the trigger switch 1. As shown in FIG. 7, the insulating wall 31 is formed sufficiently higher than the diameter of the electric wires 33*a*, 33*b* so that the solder for fixing the core wire of the electric wires 33*a*, 33*b* to the power supply electrodes 4*a*, 4*b* and the core wire of the electric wires 33*a*, 33*b* or one part of the stranded wire forming the core wire do not project or become stringy thereby short circuiting the power supply electrodes 4*a*, 4*b*.

The grooves 32, 34 are formed on the front and the back surfaces of the insulating wall 31, and the lead wires 10, 11 are arranged in the groove 32 on the front surface. The grooves 32, 34 are thickness-takeoff to reduce the resin amount, and the groove 32 is also formed as a wiring path for arranging the lead wires 10, 11 in the insulating wall.

The power supply terminals 4*a*, 4*b* and the lead wires 10, 11 are arranged in a groove formed in the dividing strip 2*b* and sandwiched at the seam of the dividing strip 2*a* and the dividing strip 2*b*. The lead wires 10, 11 are arranged vertically in a direction orthogonal to the seam of the dividing strips 2*a*, 2*b* in the groove formed in the dividing strip 2*a*. The lead wires 10, 11 must be arranged in the insulating wall 31 so as not to protrude from the insulating wall 31 to prevent short circuit with the electric wires 33*a*, 33*b*.

In addition to preventing short circuit between the lead wires 10, 11 and the electrode terminals 4*a*, 4*b*, the insulating wall 31 also serves as a guide (boss) that makes the bending stress less likely to directly act on the portion of the lead wires 10, 11 sandwiched between the dividing strips 2*a*, 2*b*. That is, the trigger switch 1 of the present embodiment does not require the insulating wall between the lead wires 10, 11 and the electrode terminals 4*a*, 4*b* and the guide of the deriving part of the lead wires 10, 11 to be separately arranged, whereby the length along the seam of the dividing strips 2*a*, 2*b* does not become long and the bottom area does not increase.

In order to derive the lead wires 10, 11 on the outer side of the insulating terminals 4*a* or 4*b*, if the lead wires 10, 11 are vinyl insulation electric wires having a conductor cross sectional area of 0.2 $mm^2$, the outer diameter of the lead wires 10, 11 of about 1.5 mm, and the insulating wall necessary between the electrode terminals 4*a*, 4*b* of about 1 mm, and the guide (boss) of the lead wires 10, 11 of about 1 mm are required, where an extra length of about 3.5 mm in total is required even if the insulating wall is formed by extending one part of the guide, whereby the bottom area of the trigger switch 1 increases. That is, in the present embodiment, the length of the bottom surface of the trigger switch 1 is successfully reduced by about 3.5 mm compared to the conventional configuration.

Accordingly, the trigger switch 1 of the present embodiment can be incorporated in an electrical power tool having a narrow grip, and a user friendly electrical power tool can be achieved.

The groove 32 formed in the insulating wall 31 acts as the wiring path of the lead wires 10, 11 in the present embodiment, but a pass-through hole may be formed in the insulating wall 31 to serve as the wiring path of the lead wires 10, 11. The insulating wall 31 covers the entire periphery of the derived portion of the lead wires 10, 11 by being divided in half and arranged for the divided strip 2*a* and the divided strip 2*b*, thereby enhancing the insulating property and further reducing the load on the portion sandwiched by the divided strips 2*a*, 2*b*.

Figure 9:
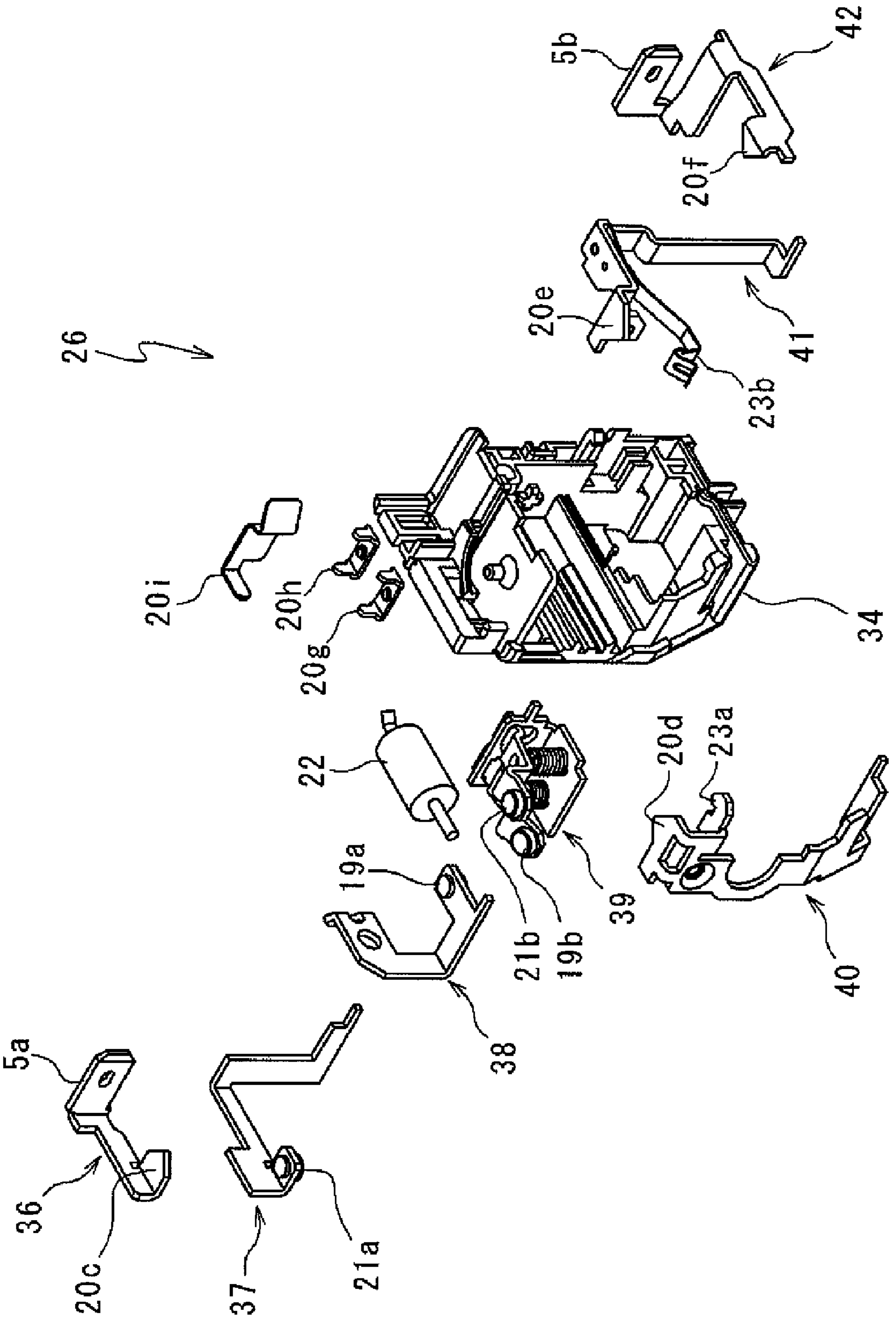
FIG. 9 shows an exploded perspective view of a base terminal assembly of the trigger switch of FIG. 1.

FIG. 9 shows a configuration of the base terminal assembly 26 of the present embodiment. The base terminal assembly 26 is formed by assembling a plurality of metal members 36, 37, 38, 39, 40, 41, 42 configuring the contact point of each switch 19, 20, 21, 23 and the electric path and the diode 22 to the base member 34 made of resin.

The metal member 36 configures the output terminal 5*a* and a fixed contact point 20*c* of the change-over switch 20, the metal member 37 configures a fixed contact point 21*a* of the full speed switch 21, the metal member 38 configures a fixed contact point 19*a* of the main switch 19, the metal member 39 configures the movable contact points 19*b*, 21*b* of the main switch 19 and the full speed switch 21, the metal member 40 configures a fixed contact point 20*d* of the change-over switch 20 and a fixed contact point 23*a* of the brake contact point 23, the metal member 41 configures a fixed contact point 20*e* of the change-over switch 20 and includes a movable contact point 23*b* of the brake contact point 23, and the metal member 42 configures an output terminal 5*b* and a fixed contact point 20*f* of the change-over switch 20.

The movable contact point 20*a* of the change-over switch 20 shown in FIG. 4 includes two movable contact points 20*g*, 20*h* as shown in FIG. 9. A latch spring 20*i* for positioning the operation lever 20*b* of the change-over switch 20 is attached to the base member 34.

Figure 10:
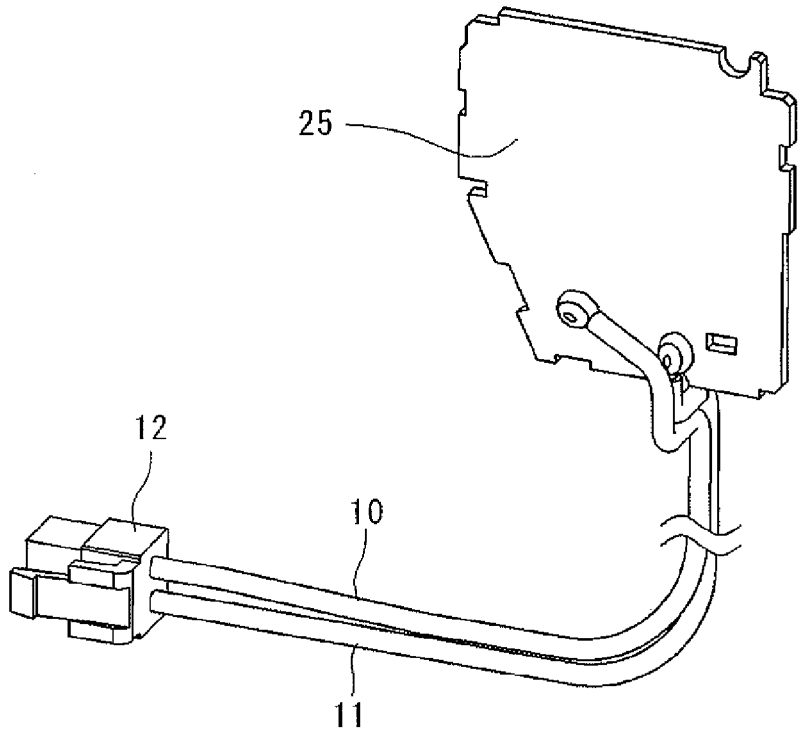
FIG. 10 shows a perspective view of a print substrate and lead wires of the trigger switch of FIG. 1.

As shown in FIG. 10, the lead wires 10, 11 are soldered and connected to the print substrate 25.

Figure 11:
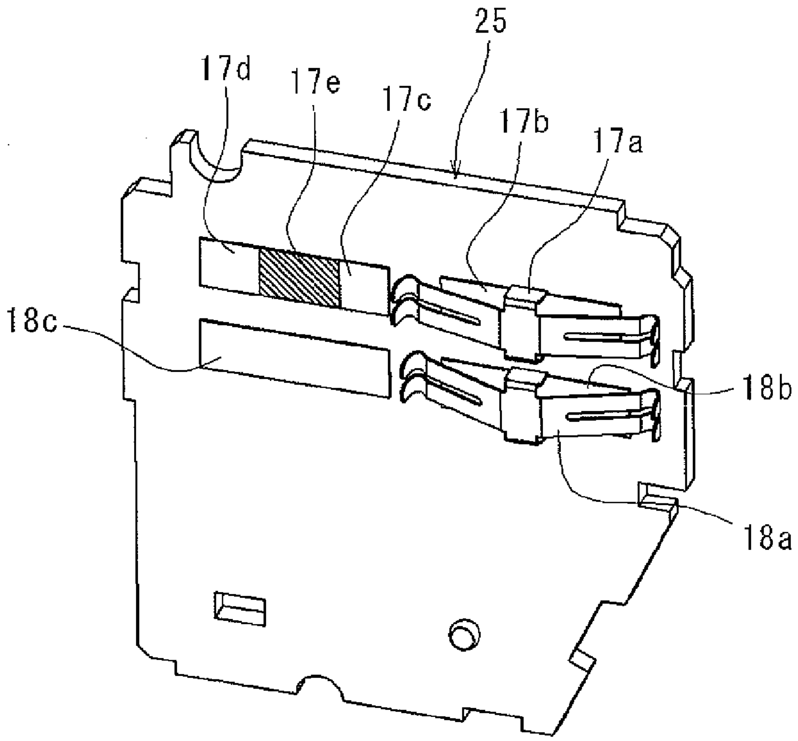
FIG. 11 shows a perspective view of a back surface of the print substrate of FIG. 10.
Figure 12:
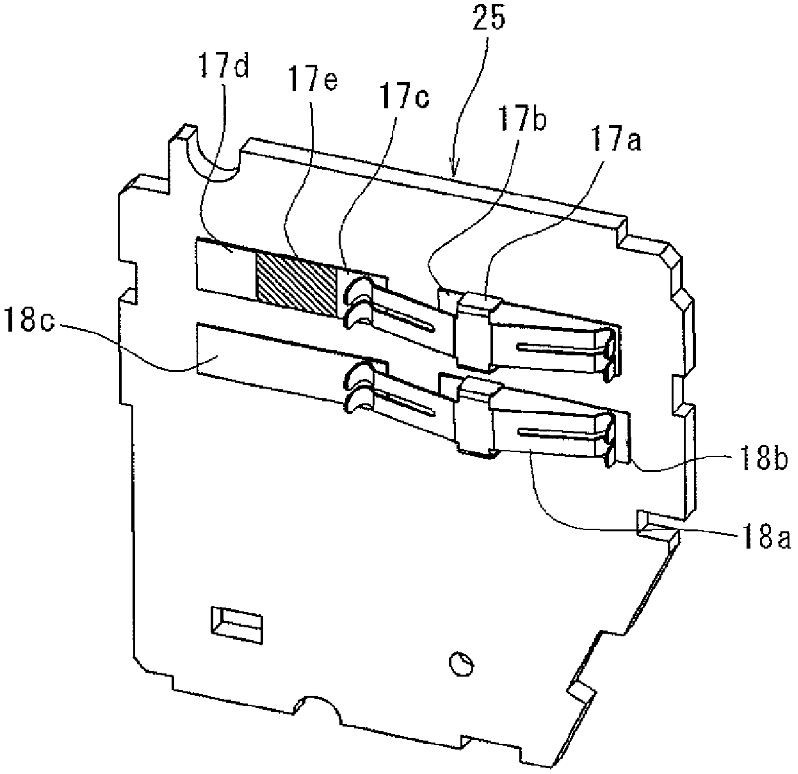
FIG. 12 shows a perspective view of a state of different trigger pull-in amounts of the print substrate of FIG. 11.
Figure 13:
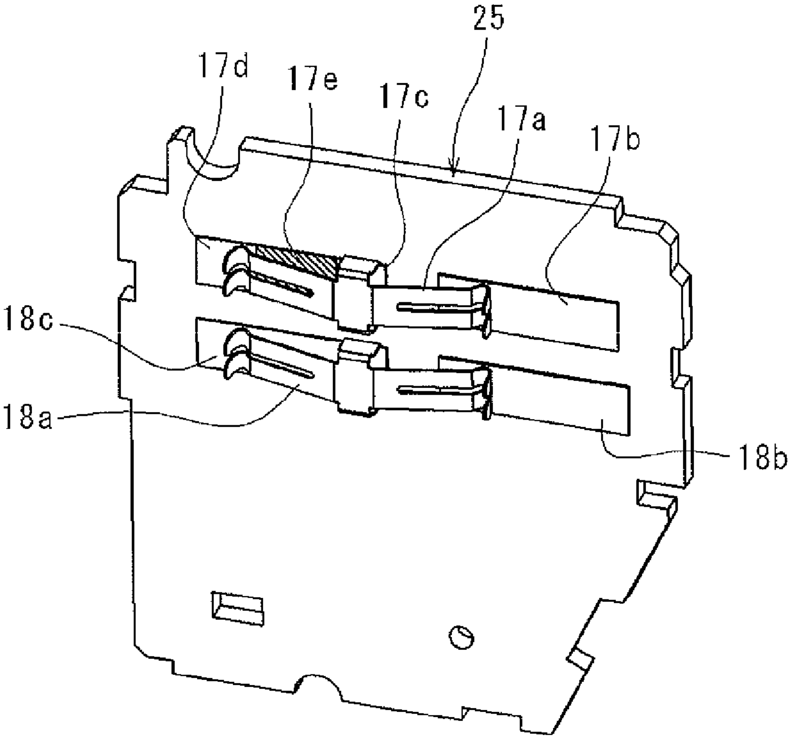
FIG. 13 shows a perspective view of a state of further different trigger pull-in amounts of the print substrate of FIG. 11.

FIGS. 11, 12, and 13 show a configuration of the voltage dividing resistor 17 and the power supply switch 18 formed on the print substrate 25.

The voltage dividing resistor 17 is configured by pattern electrodes 17*b*, 17*c*, 17*d* formed on the print substrate 25; a print resistor 17*e* formed by printing a resistive element across the pattern electrodes 17*c* and 17*d*; and the metal brush 17*a* that slidably moves on the print substrate 25 while being held by the slide member 27. The voltage dividing resistor 17 shows two resistance values dividing the print resistor 17*e* between the pattern electrodes 17*b*-17*c* and between the pattern electrodes 17*b*-17*d* depending on the contacting position of the metal brush 17*a*.

The power supply switch 18 is configured by pressing the metal brush 18*a* held by the slide member 27 against the pattern electrodes 18*b*, 18*c* formed on the print substrate 25.

FIG. 11 shows a state where the trigger 3 is pushed out from the housing 2 by the spring 28, that is, a state where the user is not operating the trigger switch 1.

As shown in FIG. 12, when the user pulls the trigger 3, the metal brush 17 and the metal brush 18*a* almost simultaneously contact the pattern electrode 17*c* and the pattern electrode 18*c*, respectively. When the metal brush 18*a* contacts the pattern electrode 18*c*, the power supply switch 18 closes and the speed control circuit 16 starts the operation.

While the metal brush 17*a* is contacting the pattern electrode 17*c*, the resistance between the pattern electrodes 17*b*-17*c* is zero and the resistance between the pattern electrodes 17*b*-17*d* shows a maximum value. When further pulling the trigger 3 so that the metal brush 17*a* contacts the print resistor 17*e*, the resistance value dividing the print resistor 17*e* between the pattern electrodes 17*b*-17*c* and between the pattern electrodes 17*b*-17*d* appears.

As shown in FIG. 13, when the user further pulls the trigger 3, the metal brush 17*a* contacts the pattern electrode 17*d*. The resistance between the pattern electrodes 17*b*-17*c* then shows a maximum value, and the resistance between the pattern electrodes 17*b*-17*d* becomes zero.

Figure 14:
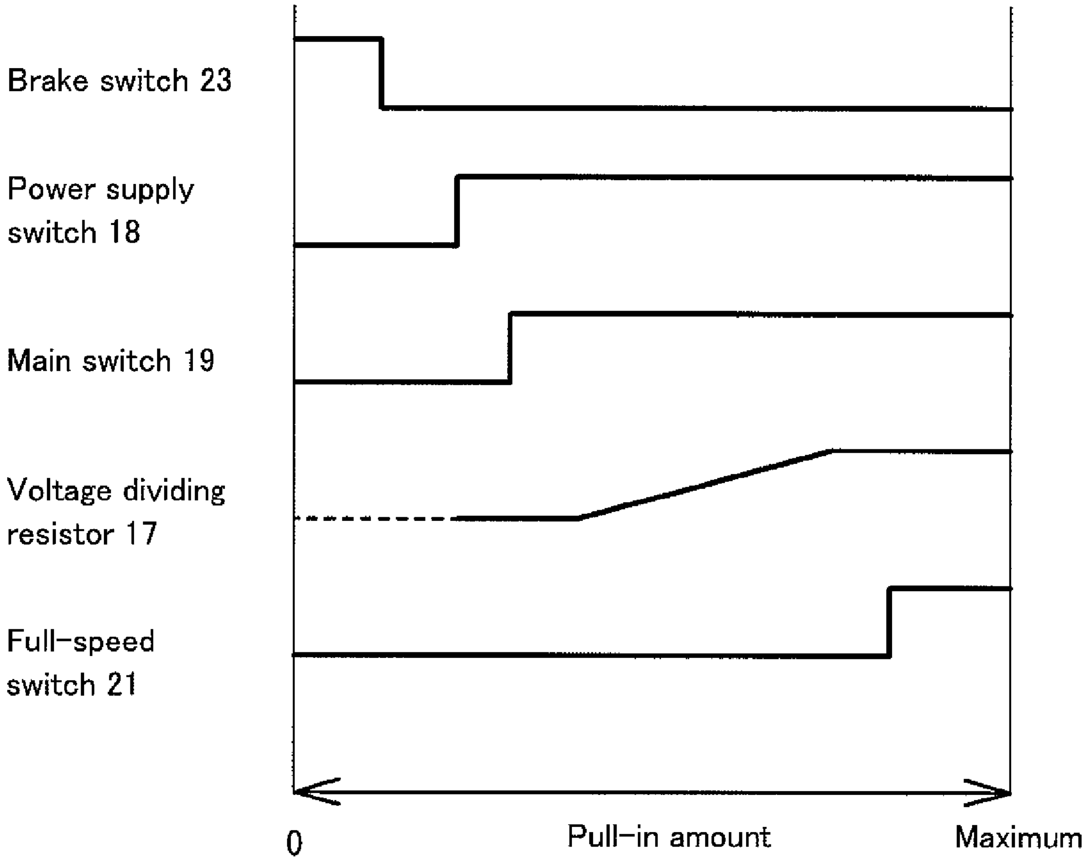
FIG. 14 shows a timing chart of a relationship between the trigger pull-in amount and the operation of each switch of the trigger switch of FIG. 1.
Figure 15:
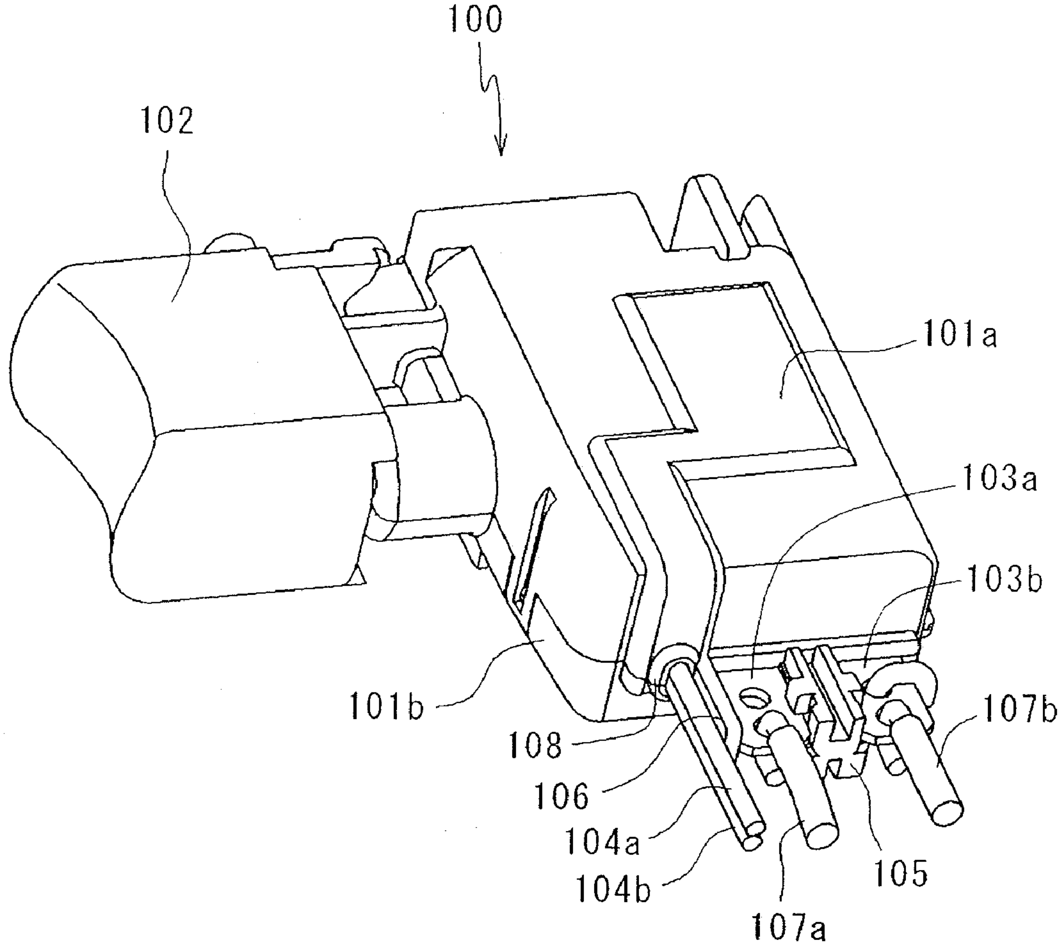
FIG. 15 shows a perspective view of a conventional trigger switch.

FIG. 14 shows the operation of each switch 18, 19, 21, 23 and the voltage dividing resistor 17 of the trigger switch 1 with respect to the pull-in amount of the trigger 3. In an initial state where the trigger 3 is not operated, the brake switch 23 is closed but other switches 18, 19, 21 are opened. The voltage dividing resistor 17 shows the resistance between the pattern electrodes 17*b*-17*c*, and is not conductive in the initial state (infinite resistance).

When beginning to pull-in the trigger 3, the brake switch 23 first opens so that the motor 14 can be driven. Subsequently, the power supply switch 18 closes, and almost at the same time, the voltage dividing resistor 17 becomes conductive. When the power supply switch 18 closes, voltage is also applied to the afterglow circuit 24, as shown in FIG. 3, and current is output to the light-emitting device 15 through the lead wires 10, 11. That is, light is projected over a processing object by the light-emitting device 15 before the electrical power tool rotatably drives the distal end tool with the motor 14, thereby facilitating the positioning of the distal end tool.

If the trigger 3 is further pulled in, the main switch 19 closes and both poles of the battery 13 connect to the motor 14 by way of the transistor 6. The transistor 6 is switched by the control circuit 16 and intermittently outputs current to the motor 14. That is, the motor 13 rotates at a speed (when load fluctuation is not taken into consideration) corresponding to the current-carrying ratio (duty) of the transistor 6.

When the trigger 3 is further pulled in, the metal brush 17*a* of the voltage dividing resistor 17 voltage divides the print resistor 17*e*, changes the output characteristic of the control circuit 16, and gradually raises the current-carrying ratio of the transistor 6. That is, the rotation speed of the motor 14 rises as the pull-in amount of the trigger 3 increases. When the metal brush 17*a* reaches the pattern electrode 17*d*, the resistance between the pattern electrodes 17*b*-17*d* becomes zero, and the current-carrying ratio of the transistor 6 becomes a maximum.

When the trigger 3 is further pulled in, the full speed switch 21 is closed, the transistor 6 is bypassed, and the battery 13 is directly connected to the motor 14. That is, the motor 14 rotates at a maximum speed (maximum output) at which the battery 13 can be driven.

When the force of pulling the trigger 3 is weakened to project the trigger 3 by the biasing force of the spring 28, the current-carrying ratio of the current applied to the motor 14 gradually decreases, and the supply of current to the motor 14 is shielded at the point the main switch 19 is opened.

When the power supply switch 18 opens, the power supply to the afterglow circuit 24 is also shielded, but since the afterglow circuit 24 accumulates the charges in the capacitor C1, the transistor TRI is turned ON while the accumulated charges are discharged through the resistors R2 and R3. That is, the afterglow circuit 24 maintains the output with respect to the lighting system 15 for a predetermined time defined by the voltage of the battery 13, the capacity of the capacitor C1, and the resistors R1, R2, R3 even after power supply is shielded, thus enabling the lighting system 15 to continue light emission.

When the trigger 3 is further projected from when the power supply switch 18 is opened, the brake switch 23 closes and rotation by inertia of the motor 14 stops. Normally, the user does not hold the trigger 3 at the position from when the power supply switch 23 is opened to when the brake switch 23 is closed, and thus the afterglow circuit 24 enables the lighting system 15 to emit light even after the brake switch 23 is closed and the motor 14 is completely stopped. In other words, the electrical power tool illuminates the processing object for a while even after the user releases the trigger 3 to stop the rotation of the distal end tool, thereby ensuring processing workability to be performed thereafter.

What is claimed is:

1. A trigger switch for performing speed control of a motor according to a pull-in amount of a trigger;

wherein a wiring path for lead wires for connecting the trigger switch and an auxiliary device is formed in an insulating wall formed between a pair of power supply terminals for isolating a pair of power supply terminals connected to a power supply from each other.

2. A trigger switch according to claim 1, further comprising an insulative housing, formed by two divided strips, for internally accommodating circuit components; wherein the power supply terminals and the lead wires are sandwiched at a seam of the housing.

3. A trigger switch according to claim 1, wherein the auxiliary device is a lighting system.

4. A trigger switch according to claim 3, further comprising an afterglow circuit for outputting to the lighting system and accumulating charges while power is being supplied to at least the motor, and maintaining the output to the lighting system for a predetermined time after the power to the motor is shielded by discharging the accumulated charges.

5. A trigger switch according to claim 3, wherein the pull-in amount of the trigger output to the lighting system is less than the pull-in amount of the trigger output to the motor.

6. A trigger switch according to claim 2, wherein the auxiliary device is a lighting system.

7. A trigger switch according to claim 6, further comprising an afterglow circuit for outputting to the lighting system and accumulating charges while power is being supplied to at least the motor, and maintaining the output to the lighting system for a predetermined time after the power to the motor is shielded by discharging the accumulated charges.

8. A trigger switch according to claim 4, wherein the pull-in amount of the trigger output to the lighting system is less than the pull-in amount of the trigger output to the motor.

9. A trigger switch according to claim 6, wherein the pull-in amount of the trigger output to the lighting system is less than the pull-in amount of the trigger output to the motor.

10. A trigger switch according to claim 7, wherein the pull-in amount of the trigger output to the lighting system is less than the pull-in amount of the trigger output to the motor.

* * * * *